June 10, 1941.  C. C. ABBOTT  2,245,085
LIQUID HEATER
Filed Aug. 28, 1938
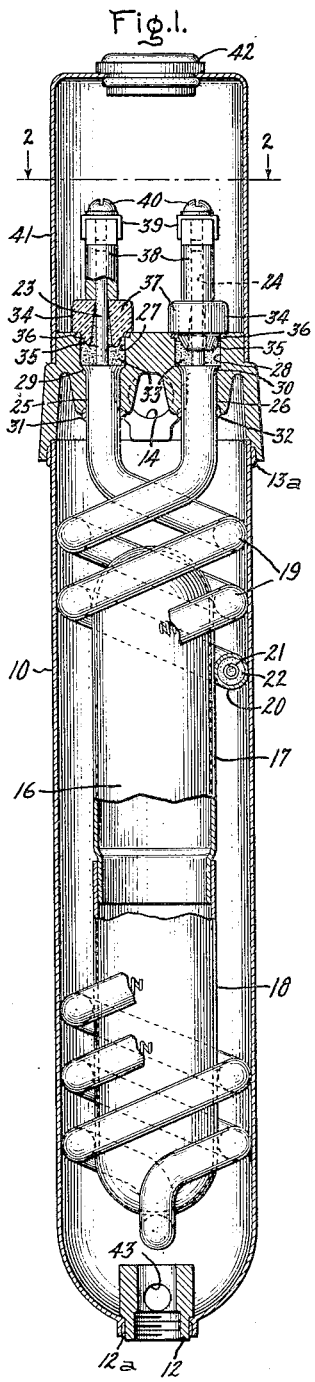
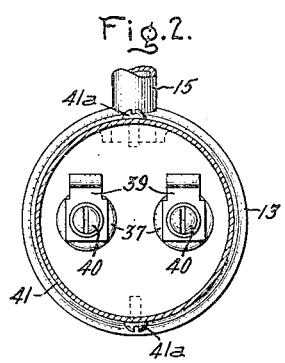
Inventor:
Charles C. Abbott,
by Harry E. Dunham
His Attorney.

Patented June 10, 1941

2,245,085

UNITED STATES PATENT OFFICE 2,245,085

LIQUID HEATER

Charles C. Abbott, Pittsfield, Mass., assignor to General Electric Company, a corporation of New York Application August 28, 1939, Serial No. 292,177

7 Claims. (Cl. 219—39)

My invention relates to new and useful improvements in heaters and more particularly electric liquid heaters such as water heaters.

It is an object of my invention to provide a liquid heater which is of simple and compact construction, which is efficient in operation, and which may be manufactured at low cost.

It is a further object of my invention to provide an instantaneous liquid heater constructed and arranged so that the thermal inertia of the heater is reduced to a minimum.

It is a more specific object of my invention to provide a new and improved liquid heater employing a sheathed wire type heating unit the metallic sheath of which cooperates with the other portions of the heater construction to form a spiral path through the heater for the liquid being heated.

Further objects and advantages of my invention will appear as the following description proceeds and the features of novelty which characterize my invention will be more fully set forth in the claims appended to and forming a part of this application.

For a more complete understanding of my invention, reference should be had to the accompanying drawing in which—Fig. 1 is a front sectional elevation of my improved water heater and Fig. 2 is a view partly in section taken on the line 2—2 of Fig. 1.

Referring to the drawing, it will be observed that my improved liquid heater construction comprises a substantially cylindrical outer shell 10 rounded at one end and open at the opposite end. Provided in the rounded end of the outer shell is an outlet sleeve 12 and arranged to cover the open end of the shell is a cap 13 having an inlet opening 14. In order to produce a liquid-tight construction, the outlet connection 12 and the cap 13 are secured to the shell 10 by a brazed or soldered joint 12a and 13a respectively. It will be understood that the inlet opening 14 will be connected to a cold water supply pipe 15 and the outlet sleeve 12 will be connected to a hot water supply system (not shown).

Provided within the outer shell 10 is a central core member 16 made of copper or brass or some similar good heat conducting material. In order to reduce the mass of this core member and thus reduce the thermal inertia of the heater unit so that the time required to produce hot water when starting from a cold condition is decreased, the core member 16 is made in the form of a hollow cylinder having relatively thin walls. In the preferred form of my invention, the core member 16 is made from two hollow cylindrical members 17 and 18 closed at one end and hermetically sealed together at their open ends.

Provided within the outer shell 10 is a heating element 19 which is in the form of two spirals or a double helix as shown in Fig. 1. In forming the heater element it is first bent to a hairpin shape and then both legs of the hairpin are wound simultaneously on a suitable arbor. After forming, the heater element and core member are assembled so that the core member is supported by the heater element.

The spirals of the heating element are formed so that their outside diameters are substantially the same as the inside diameter of the shell 10 and their inside diameters are substantially the same as the outside diameter of the core 16. With such a construction and arrangement, the heating element, when located in its operative position between the shell 10 and the metallic core 16, engages the inside wall of the outer shell and the outside wall of the core to define a pair of spiral paths which the liquid, in traveling from the inlet 14 to the outlet 12, must follow thus increasing the length of time the liquid is in contact with the heater element. It is to be observed that with my improved heater construction, the liquid being heated comes in direct contact with the heating element thereby increasing the efficiency of heat transfer between the liquid and the element.

In the preferred form of my invention, the heating element 10 is of the sheathed wire type such as is described and claimed in United States Letters Patent 1,367,341, granted February 1, 1921 on an application filed by myself. Briefly, such a heater element comprises an outer metallic sheath 20 in which a coiled resistance unit 21 is embedded in a compacted mass of powdered heat refractory, electrically insulating material 22, such as magnesium oxide. One characteristic of such a heater unit is that it can be readily formed to the desired spiral shape. It will be understood that the resistance unit 21 has its ends connected to electric terminals 23 and 24 which project from the ends of the sheath 22 and are electrically insulated from the sheath.

As shown in Fig. 1, the cap 13 is provided with a pair of openings 25 and 26 into which the end portions of the heating unit are projected. These openings 25 and 26 communicate with enlarged chambers 27 and 28. The cap 13 serves as a support from which the heating unit is suspended. In effecting this support, the ends of the sheath 22 are projected through the openings 25 and 26 and into the chambers 27 and 28 respectively. The portion of the sheath projecting beyond the end of the openings 25 and 26 is flared outwardly against the shoulders 29 and 30 formed by the increase in diameter of chambers 27 and 28 over the openings 25 and 26. In order to improve the strength of this supporting structure and to provide a leak-proof connection, the heating unit is further secured to the cap 13 by brazed joints 31 and 32.

In order to electrically insulate the terminals 23 and 24 from the cap 13, a mass of insulating material 33, such as a suitable phenolic condensation product, is provided to completely fill each of the chambers 27 and 28. In order to make this joint liquid-tight, the phenolic condensation product is cured after filling as described in Patent 1,770,824, issued July 15, 1930, on an application filed by myself. Each of the chambers is closed by means of a bushing 34 made from some suitable electrically insulating material such as porcelain and a portion 35 which extends into each of the chambers 27 and 28. In order to keep the phenolic condensation product from escaping during the curing operation, which causes it to swell, a copper or other suitable gasket 36 is provided between the head 37 of each bushing and the cap 13.

As described in my aforementioned Patent 1,770,824 the bushing 37 will be put in place while the material 33 is in a semi-plastic state so that the material is free to flow around the portion 35 and secure the bushing in position upon hardening. Preferably, the opening in the bushing through which the terminals 23 and 24 pass will be tapered so that when the bushing is forced into position the material will flow upwardly through the opening about the terminal.

Secured to the end of each terminal 23 and 25 is a connector 38. Preferably these connectors will be of the tubular type and will be compressed about the ends of the terminals by some suitable swaging operation. Each connector is provided with a clamping member 39 secured to the connector by means of a screw 40.

A suitable cover 41 is provided which is secured to the cap 13 by means of suitable screws 41a and encloses the connectors and clamping members. This cover is provided with an insulating bushing 42 through which conductors may pass to the connectors in order to connect the heater to a suitable source of electrical supply.

In suspending the heater element 19 from the cap 13 it is possible that the unit may sag or lengthen due to the turns of the spiral opening up. This sagging might be sufficient to cause the end of the unit to come into engagement with the outlet sleeve 12 and partially or totally block the flow of liquid therethrough. In order to remove this possibility of reducing or shutting off the flow of liquid if the heating unit sags, two cross holes 43 (one only of which is shown in Fig. 1) are provided in the sleeve 12 adjacent the bottom of the shell. In the event that the heater unit sags so that it tends to close the opening provided centrally of the outlet sleeve 12, the flow of liquid will continue unimpeded through the openings 43.

In the operation of my improved liquid heater construction the inlet opening 14 provided in the cap 13 is connected to the cold liquid supply system and the outlet sleeve 12 is connected to the hot liquid supply system. Upon a demand for heated liquid, the heater unit 19 is energized and liquid is drawn into the shell 10 through the inlet 14 and passes through the shell in a spiral path being at all times maintained in contact with either the sheath 22 of the heater element 19 or the core 16 and outer shell 10 which are heated by the element 19. Since the thermal inertia of core 16 is low, the temperature of the core will be rapidly brought to substantially the temperature of the heater sheath 22 and hot water will be substantially instantaneously produced in the heater unit. It is to be understood that the outer shell 10 of the heater will be suitably insulated so as to prevent loss of heat to the surrounding atmosphere.

From the foregoing description it will be observed that I have provided an improved liquid heater which is simple in construction, may be manufactured at relatively low cost, and is constructed and arranged so as to produce hot water substantially instantaneously upon the energization of the heater element located therein. It will also be observed that I have provided an electric heater constructed and arranged so that the liquid being heated passes through the heater in a substantially spiral path formed by the electric heater element, thus effecting intimate contact between the heater element and liquid being heated so that efficient heat transfer is obtained.

While I have shown a particular embodiment of my invention, it will be understood, of course, that I do not intend to be limited thereto, since many modifications may be made, and I, therefore, contemplate by the appended claims to cover any such modifications as fall within the true spirit and scope of my invention.

What I claim as new and desire to secure by Letters Patent of the United States is:

1. In a liquid heater, an outer shell, an inner hermetically sealed hollow core member, and a spirally wound sheathed wire type of heating unit lying between the outer wall of said core member and the inner wall of said shell and cooperating therewith to define a spiral path through said shell.

2. In a liquid heater, an outer shell, an inner hermetically sealed hollow core member, and a sheathed wire type of heating unit spirally wound about said core member, the outside diameter of the spiral being substantially the same as the inside diameter of said outer shell and the inside diameter of the spiral being substantially the same as the outside diameter of said core member so as to define a spiral path through said heater for the liquid to be heated.

3. In a liquid heater, an outer shell, an inner hermetically sealed hollow metallic core member, a heating unit lying between said outer shell and said core member, said heating unit being wound in the form of two spirals having an outside diameter substantially the same as the inside diameter of said outer shell, said outer shell and core member and heating unit cooperating to form a spiral path for the liquid being heated to follow in flowing through said heater.

4. In an electric hot water heater, an outer shell, an inner hermetically sealed hollow metallic core member, a spirally wound sheathed wire type of heating unit lying between said outer shell and said core member, the said heating unit engaging the inside wall of said outer shell and the outside wall of said core member so as to define a spiral path through said shell for the liquid to be heated.

5. In an electric liquid heater, an outer shell open at one end, a cap for closing said open end, means defining a liquid inlet and liquid outlet one of which is in said shell and the other in said cap, a hollow metallic cylinder arranged centrally within said shell, and a heating unit comprising a coiled resistance unit embedded in a mass of heat refractory electrical insulating material and encased by a metallic sheath spirally wound in the form of a double helix, said sheath of said heating unit engaging the outer wall of said cylinder and the inner wall of said shell to define a spiral path between said inlet and said outlet which the liquid being heated is adapted to follow.

6. In a liquid heater unit, an outer shell having one end open and the other end substantially closed, means defining a liquid outlet in said closed end, a cap closing said open end, means defining a liquid inlet in said cap, a hollow metallic core member arranged centrally of said shell, a sheathed wire type of heating unit spirally wound about said core member, said heating unit engaging the outer wall of said core member and the inner wall of said shell to define a spiral path to be followed by liquid traveling through said shell, and means for supporting said heater unit on said cap.

7. In an electric liquid heater, an outer shell having one end open and the other end substantially closed, a cap closing the open end of said shell and having a liquid inlet therein, a hollow metallic core member arranged centrally of said shell, a sheathed wire type heating unit spirally wound in the form of two spirals arranged about said core member, said heating unit engaging the outer wall of said core member and the inner wall of said shell to define a spiral path through the liquid heater unit for the liquid to be heated, means for suspending said heating unit from said cap, and an outlet sleeve in the closed end of said shell, said outlet sleeve having a plurality of openings therein so that the flow of liquid will continue uninterrupted if said suspended heating unit should sag so as to overlie a portion of said outlet sleeve.

CHARLES C. ABBOTT.